United States Patent [19]

Arndt et al.

[11] 4,004,275
[45] Jan. 18, 1977

[54] SELF-CLOCKING DATA ENTRY UNIT SYSTEM

[75] Inventors: Richard Louis Arndt, Byron; Thomas Richard Teal, Rochester, both of Minn.

[73] Assignee: International Business Machines Corporation, Armonk, N.Y.

[22] Filed: Jan. 12, 1976

[21] Appl. No.: 648,446

[52] U.S. Cl. .................... 340/168 S; 340/147 SY; 328/63; 179/15 AL; 178/69.1
[51] Int. Cl.² ..................... H04Q 5/00; H03K 1/17; H04J 3/00
[58] Field of Search ..... 340/168 R, 168 S, 147 SY; 328/63; 307/269; 178/69.5; 179/15 AL

[56] References Cited
UNITED STATES PATENTS

| | | | |
|---|---|---|---|
| 3,680,050 | 7/1972 | Griffin | 340/168 S |
| 3,688,036 | 8/1972 | Bland | 340/147 SY |
| 3,781,478 | 12/1973 | Blahut et al. | 179/15 AL |
| 3,893,033 | 1/1975 | Finch | 328/63 |
| 3,967,062 | 6/1976 | Dobias | 178/69.5 R |

*Primary Examiner*— Yusko
*Attorney, Agent, or Firm*—Keith T. Bleuer

[57] ABSTRACT

A self-clocking data entry unit system including a plurality of data entry units connected in seris in a loop which is connected at its ends to a controller. Data bits are provided by the controller flowing in one direction through the loop to each of the data entry units, and the data entry units supplant these data bits with new data bits which flow in the same direction through the loop back to the controller. Control bits are interspersed with the data bits, and each of the data bits has an accompanying tag bit that acts as a controlling bit but is of a different type than the first mentioned control bits so that there is a controlling bit of one type or another for each of the bit positions flowing through the loop for controlling the operation of the data entry units and maintaining their operation synchronized with the micro-controller.

11 Claims, 6 Drawing Figures

SELF-CLOCKING DATA ENTRY UNIT SYSTEM

BACKGROUND OF THE INVENTION

The invention relates to data entry unit systems and more particularly to such a system in which a plurality of serially connected data entry units are arranged in a closed loop.

Closed loop data entry unit systems have been previously proposed and in order to maintain synchronism between a controller connected to the loop and the data entry units, extra leads have generally been provided, in addition to the required lead pair for transmitting data, for clocking the data entry units with respect to the controller so as to maintain synchronism between the data entry units and the controller. Since the prior data entry unit systems were not self-clocking, if no auxiliary clocking lead was desired, it was necessary to provide each of the data entry units with a local oscillator. Also, such prior data entry units required logic for determining if valid and complete data was received by each of the data entry units.

SUMMARY OF THE INVENTION

It is an object of the present invention to provide an improved data entry unit system which is self-clocking and which requires only the usual pair of leads for connecting a plurality of the data entry units in a loop with a controller.

In a preferred form, the data entry unit system of the invention includes a micro-controller for transmitting control bits, data bits and tag bits to a series of data entry units which are connected in a loop with the micro-controller. The control bits constitute excursions of a signal in the same directions as the excursions constituting the data bits, and the tag bits each follows a data bit and constitute excursions of signal in the direction opposite to the excursions for the data bits and control bits. Controlling bits, either in the form of the above mentioned control bits or in the form of the tag bits, thus continuously flow through the loop and through the data entry units connected in the loop so that the system is self-clocking.

DESCRIPTION OF THE PREFERRED EMBODIMENT

Figure 1:
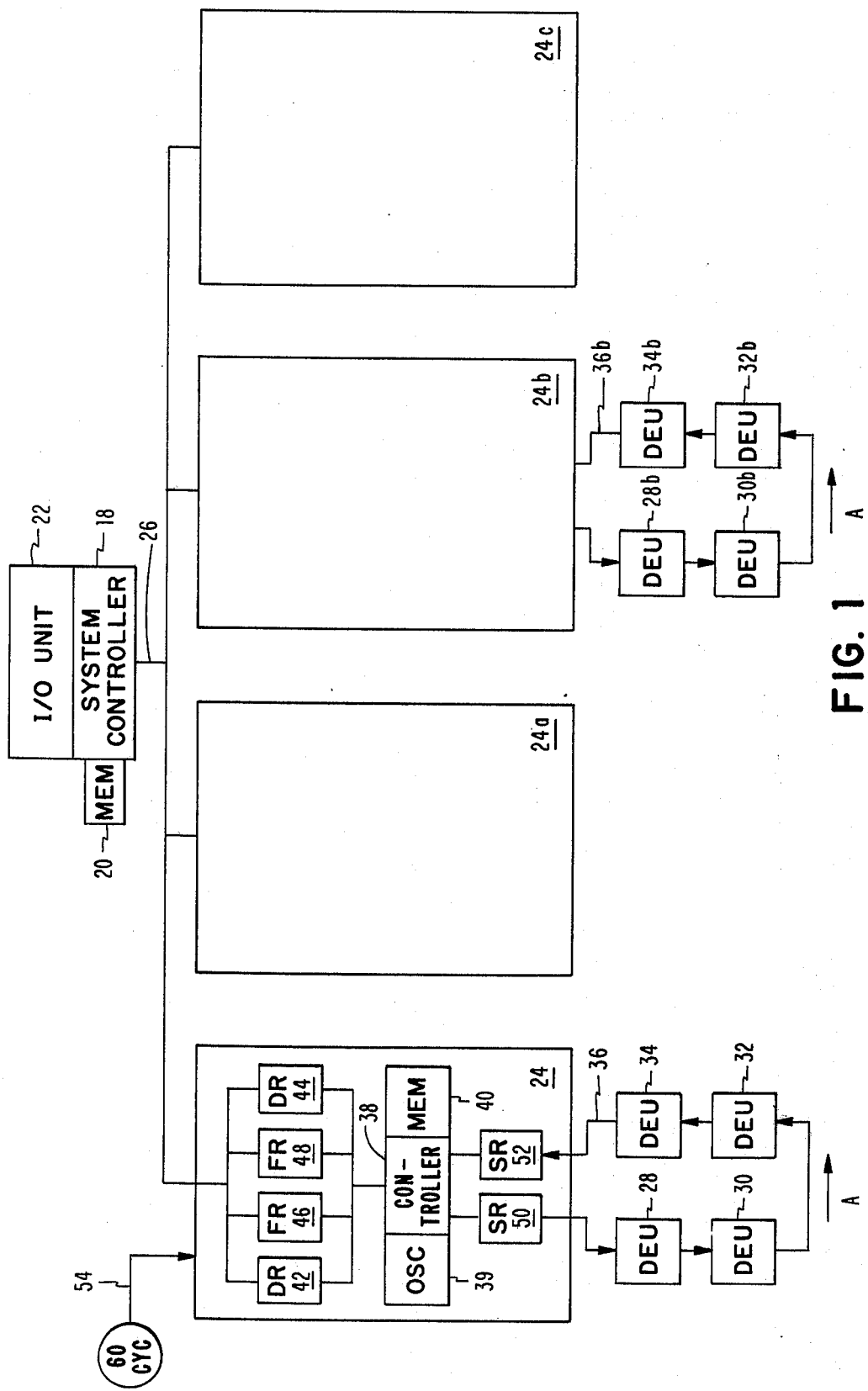
FIG. 1 is a schematic illustration of the data entry unit system of the invention including a plurality of multiplexers connected to a system controller and a series of data entry units connected in a loop with each of the multiplexers.

Referring to FIG. 1, the data entry unit system may be seen to comprise in general a controller 18 having a memory 20 coupled to it, an input-output unit 22 coupled to the controller 18 for receiving data from the controller and for supplying data to the controller, a plurality of multiplexers 24, 24a, 24b and 24c connected by means of an interface 26 with the controller 20, and four data entry stations or units 28, 30, 32 and 34 connected by means of a line 36 in the form of a loop with the multiplexer 24. Four data entry units may be attached to each of the multiplexers 24a, 24b, and 24c in the same manner as the data entry units 28, 30, 32 and 34 are attached to the multiplexer 24, and the multiplexer 24b is shown as having the data entry units 28b, 30b, 32b and 34b connected to it by means of a transmission line 36b in the form of a loop.

The multiplexers 24, 24a, 24b and 24c have the same internal components, and those for the multiplexer 24 are shown in FIG. 1. The multiplexer 24 includes a microcontroller 38 having an oscillator 39 and a memory 40 attached to it, a pair of data registers 42 and 44 respectively supplying data to the microcontroller 38 and to the interface 26, and a pair of flag registers 46 and 48. A pair of shift registers 50 and 52 connect the line 36 with the microcontroller 38. A 60 cycle per second power supply line 54 is connected with the multiplexer 24 for control purposes as will be described.

Figure 2:
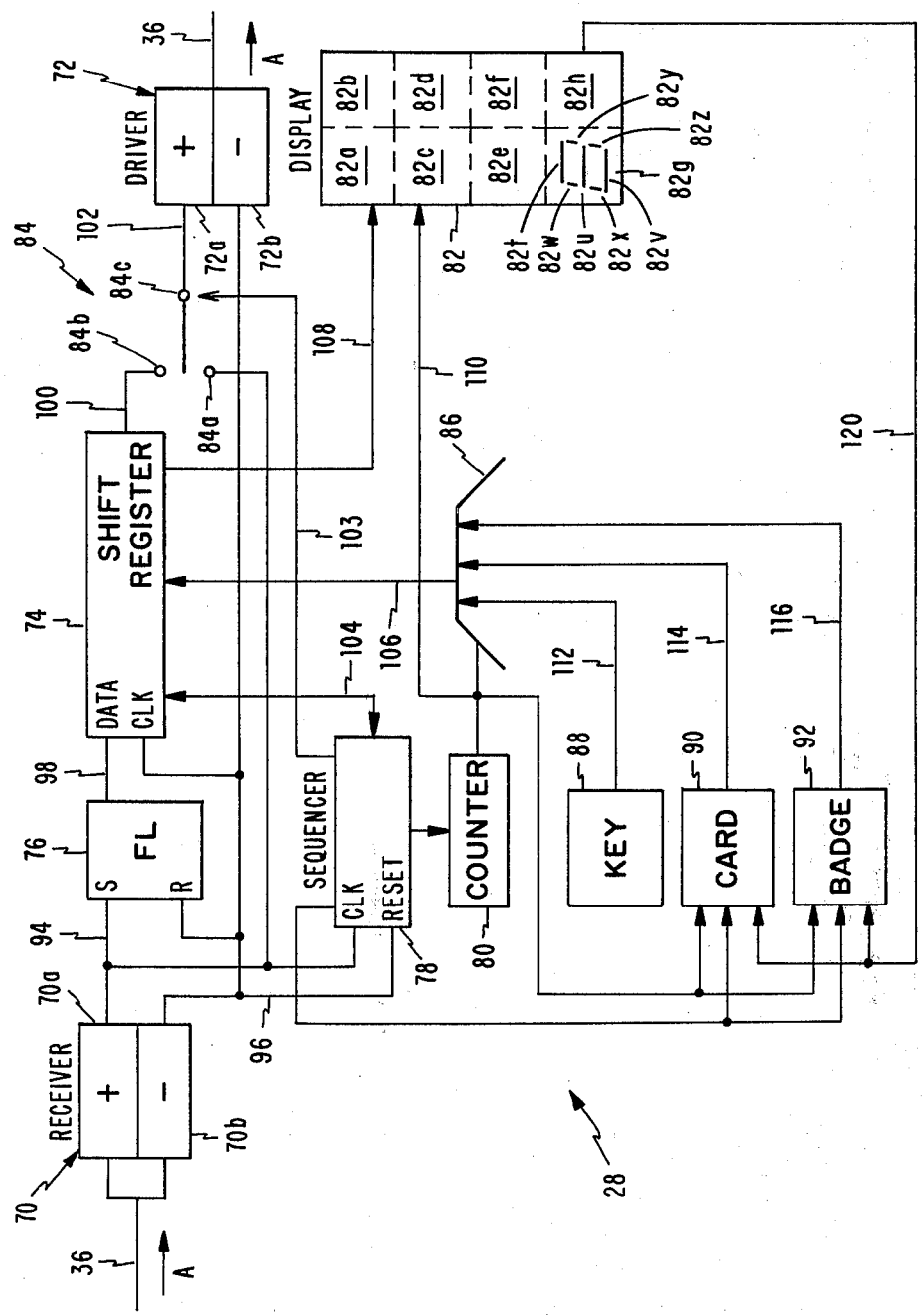
FIG. 2 is a diagram showing the components of one of the data entry units.

The internal components and connections of the data entry unit 28 are shown in FIG. 2, and the structures of the other data entry units are identical with that of the data entry unit 28. Referring to FIG. 2, the data entry unit 28 may be seen to include a receiver 70 connected to receive signals from the loop line 36 and a transmitter or driver 72 transmitting signals to the continuation of the loop line 36. The data entry unit 28 also includes a shift register 74, a flip latch 76, a sequencer 78, a counter 80, a display 82, a switch 84 and an electronic funnel 86. A keyboard 88, a card reader 90 and a badge reader 92 are provided for supplying data to the data entry unit 28.

The receiver 70 has a plus part 70a and a minus part 70b, and the transmitter 72 has corresponding plus and minus parts 72a and 72b. The output of the receiver part 70a is connected by means of a lead 94 with the set terminal of the flip latch 76, a clocking terminal of the sequencer 78 and a pole or contact 84a of the switch 84.

The output of the minus part 70b of the receiver 70 is connected by means of a lead 96 with a reset terminal of the sequencer 78, the reset terminal of the flip latch 76, a clocking terminal of the shift register 74 and the input of the minus part 72b of the transmitter 72. The output of the flip latch 76 is connected by means of a lead 98 with a data input terminal of the shift register 74, and the output of the shift register 74 is connected by means of a lead 100 with a pole 84b of the switch 84. The common pole 84c of the switch 84 is connected by means of a lead 102 with the input of the plus part 72a of the transmitter 72. The operation of the switch 84 is controlled by a signal on a lead 103 connected with the sequencer 78.

A lead 104 connects the sequencer 78 and shift register 74, and a lead 106 connects the electronic funnel 86 with the shift register 74. A lead 108 connects the shift register 74 with the display 82, and a lead 110 connects the counter 80 with the display 82, with the readers 90 and 92 and with the funnel 86. Data transfer leads 112, 114 and 116 respectively connect the keyboard 88, the card reader 90 and the badge reader 92 with the funnel 86. An end read-write control lead 118 connects sequencer 78 with readers 90 and 92, and lead 120 connects display 82 with the readers 90 and 92.

In operation, the memories 20 and 40 act as buffers for transient data storage. Both of the memories 20 and 40 are read/write memories but have in addition read only portions. The controller 18 is a microcontroller as is the controller 38. More specifically, the read/write memories 20 and 40 function as follows: data is collected by the data entry units 28, 30, 32 and 34, and this data passes through the shift registers 74 of the data entry units to the microcontroller 38. The read/write memory 40 in conjunction with the microcontroller 38 buffers this data and holds it for a time. At the end of the holding time, the data so buffered may proceed through the data register 44 to the microcontroller 18 by means of the interface 26. The read/write memory 20 in conjunction with the microcontroller 18 then buffers the latter data for another period of time. At the end of this time, the data passes to the I/O device 22. For data moving in the other direction, from the microcontroller 18, the data has been buffered by the read/write memory 20 for a time, this data coming from the I/O device 22. At the end of the buffering time, this data moves through the interface 26 and the data register 42 to the microcontroller 38. The read/write memory 40 used in conjunction with the microcontroller 38 buffers this data and keeps it, and this data functions to modify the control sequence of the microcontroller 38. It should be noted that the operation of the microcontroller 18 is asynchronous with respect to the operation of the microcontroller 38, and the data registers 42 and 44 act as accumulators or buffers so as to allow this asynchronous operation. The flag registers 46 and 48 operate to indicate the presence of data in either the data register 42 for the flag register 46 or the data register 44 for the flag register 48. The data register 42 is used for data flowing in one direction toward the microcontroller 38, and the data register 44 is used for data flowing from the microcontroller 38 to the controller 18 by means of the interface 26.

The microcontroller 38 under the control of data supplied thereto from the data entry units 28, 30, 32 and 34 or from controller 18, and under control of the memory 40 and oscillator 39, produces control bits and data bits; and these control bits and data bits flow in only one direction A through the loop 36. Data and control bits flow from the microcontroller 38 through the shift register 50 to the data entry unit 28, thence to the data entry unit 30, thence to the data entry unit 32 and finally to the data entry unit 34. None of the data bits that is supplied to the data entry unit 34 flows back to the microcontroller 38 as will be hereinafter described in greater detail, but some of the control bits flow back through the loop 36 and through the shift register 52 to the microcontroller 38. The purpose of the shift registers 50 and 52 is simply to transmit the data bits and control bits to and from the loop 36.

Figure 3:
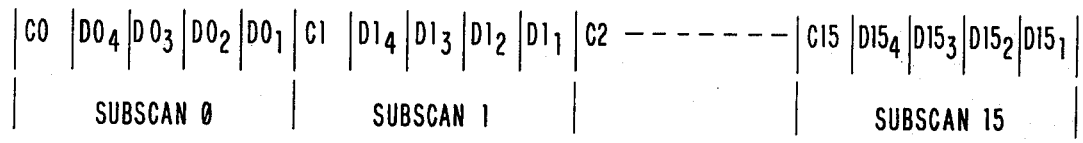
FIG. 3 is a diagram showing the manner in which control bits, data bits and tag bits flow through the loop from one of the multiplexers to the connected data entry units.

The control bits and data bits are in the form of the control cycle which is illustrated in FIG. 3 and which as shown in FIG. 3 is divided into 16 subscans. Each of subscans 0, 1 . . 15 includes four data fields and one control field, there being one data field in each subscan for each of the data entry units 28, 30, 32 and 34 on the loop 36. There may be 15 bits in each of the control fields and in each of the data fields. The bits in the control fields, C0, C1, C2 . . . C15 control the data entry units 28, 30, 32 and 34 as will be hereinafter more specifically described, and the data fields with the subscripts 4, 3, 2 and 1 are intended for and come to rest eventually in the data entry units 34, 32, 30 and 28 respectively. More particularly, the 15 bits of data field $D0_1$ are intended for and come to rest for a very short period of time in the first data entry unit 28 and particularly in its shift register 74. Likewise, at substantially the same time, the 15 bits each of the data fields $D0_4$, $D0_3$ and $D0_2$ come to rest in the shift registers 74 of the data entry units 34, 32 and 30. The same is true of the data fields in the succeeding scans. The bits of the data fields with the subscript 4 come to rest in the shift register 74 of the fourth data entry unit 34; the 15 bits of each of the data fields with the subscript 3 come to rest in the third data entry unit 32; the 15 bits of each of the data fields with the subscript 2 come to rest in the shift register 74 of the second data entry unit 30 and the 15 bits of each of the data fields with the subscript 1 come to rest in the shift register 74 of the first data entry unit 28. Although the 15 bits of the data fields with the subscript 4 and intended for the data entry unit 34 pass through the previous data entry units 28, 30 and 32 in the loop, these bits are utilized only by the fourth data entry unit 34, and likewise the previous data entry units 28, 30 and 32 utilize only the 15 bits of the data fields having the subscripts 1, 2 and 3. It will be understood that subscan 1 follows subscan 0, subscan 2 follows subscan 1, etc., until the bits of subscan 15 pass through the loop 36. Then another control cycle begins having the same 16 subscans but perhaps with different data.

Each of the 15 bits of each control field, control field C0 for example, all pass to the first data entry unit 28 from the shift register 50, and one of these 15 bits is used up by the first data entry unit 28. The remaining 14 bits of the control field pass to the second data entry unit 30, and this data entry unit uses up the second one of the control bits. Likewise each of the other data entry units 32 and 34 uses up an additional one of the 15 bits of the control field so that the remaining 11 bits of control field C0, for example, pass back to the microcontroller 38 through the shift register 52 and are not used. This is true for all of the bits in each of the control fields, C1, C2 etc., for each of the 15 subscans of the control cycle as shown in FIG. 3.

Figure 4:
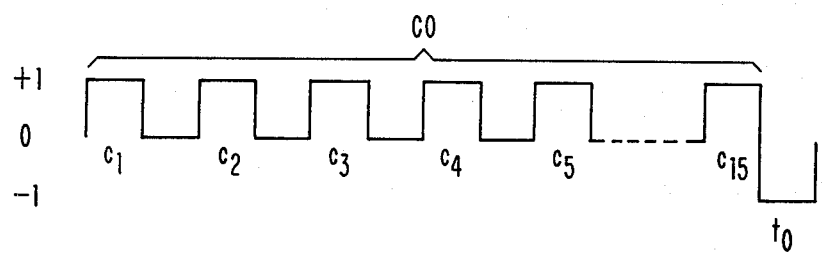
FIG. 4 is a diagram showing the control bits flowing through the loop.

The control bits, for example the 15 control bits of the control field C0, have the forms shown in FIG. 4. Control bits $c_1, c_2, c_3, c_4, c_5 \ldots c_{15}$ all rise from 0 to +1 and then decrease from +1 back to 0. The +1 may be 5 volts or may be 20 milliamps, for example, depending on whether voltage or current logic is used.

Figure 5:
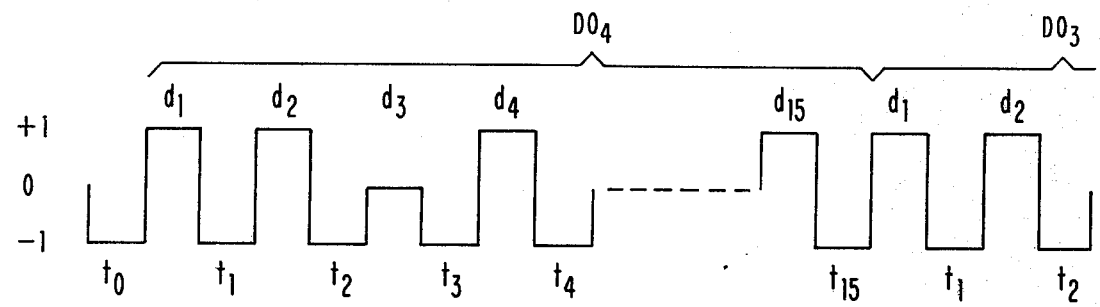
FIG. 5 is a diagram showing the data bits and tag bits flowing through the loop.

The data bits, for example the 15 data bits in the field $D0_4$, rise from 0 to +1 and decrease again from +1 to 0; however, it will be understood that the data bits may or may not exist, depending upon the data that is being transmitted to the respective data entry units 28, 30, 32 and 34. Data bits $d_1, d_2, d_3, d_4$ and $d_{15}$ for data field $D0_4$ and also the subsequent data bits $d_1$ and $d_2$ for data field $D0_3$ are, for example, shown in FIG. 5. Data bit $d_3$ as it is shown in FIG. 5 may be zero and does not actually exist.

A tag bit, for example the tag bits $t_1, t_2, t_3$ and $t_4$, follows each of the data bits (whether or not the data bits actually exist with an excursion from 0 to +1 and back again). Each of the tag bits consists of an excursion from 0 to −1 and back again to 0 as is apparent from FIG. 5 and exists whether or not there has been a previous excursion from 0 to +1 and back again denoting data. Therefore, if there actually is no data being transmitted, only the tag bits will remain, consisting of excursions from 0 to −1 and back again. There are thus, for each of the subscans in a control cycle 15 definite control bits $c_1 \ldots c_{15}$ and 60 definite following tag bits (one additional tag bit $t_0$ is used to identify the last control bit $c_{15}$ in each control field C0–C15). These control and tag bits are produced by the microcontroller 38 functioning under the control of the oscillator 39 and all function for timing purposes as will be hereinafter described in greater detail. The tag bits may thus be considered as a second type of controlling bit if desired. The basic difference between the control bits and the tag bits is of course the fact that the control bits consist of excursions from 0 to +1, while the tag bits consist of excursions from 0 to −1, all of these excursions consisting of the output of the shift register 50 and applied to the first data entry unit 28.

The receiver part 70a illustrated in FIG. 2 is constructed to recognize only the excursions of the signal applied thereto from 0 to +1, and the receiver part 70b is constructed to recognize only the signal excursions from 0 to −1. Likewise, the transmitter parts 72a and 72b respectively transmit only signal excursions from 0 to +1 and 0 to −1 respectively.

The display 82 may have eight display positions 82a, 82b, 82c, 82d, 82e, 82f, 82g and 82h. Each of these display positions may include the usual segments or bars 82t, 82u, 82v, 822, 82x, 82y and 82z that may be lighted when the display is refreshed. This refresh data is derived from the shift register 74 as will hereinafter be described in greater detail, and each of the first eight subscans of the control cycle is allocated to one of the display positions. Subscan 0, for example, may be allocated to the first display position 82a; subscan 1 may be allocated to the second display position 82b, etc. With there being eight display positions 82a–82h, subscans 0–7 refresh with new data all of the display positions, and the following subscans 8–15 again have this action with respect to all of the display positions. The display positions are thus refreshed twice during each control cycle.

The count in the counter 80 reflects the current subscan count and is incremented once each subscan is reset during the 0 subscan of each control cycle by a synchronization bit, for example bit $d15$, of each data field $D0_4, D0_3, D0_2, D0_1, D1_4, D1_3 \ldots D15_2, D15_1$. The synchronization bit $d15$ is a logical one during $D0_1$, $D0_2$, $D0_3$ and $D0_4$ for the resetting action and is a logical zero for the other data fields of the control field for the incrementing action.

The individual subscans within a control cycle are allocated to specific ones of the display positions 82a–82h, and this allocation is controlled by the counter 80. The counter 80 also controls funnel 86 and thus allocates with respect to the data input devices 88, 90 and 92, determining when each of these devices may be effective to send data to the shift register 74. More particularly, the subscan count as counted by counter 80 determines which of the input devices 88, 90 and 92 may transmit data through the funnel 86 to the shift register 74; and subscan 0, for example, can apply to the keyboard 88 while subscan 1 can apply to the card reader 90. The keyboard 88, card reader 90 and badge reader 92 are conventional units and supply data to funnel 86 respectively on the leads 112, 114 and 116 when keys on the keyboard 88 are depressed, when a card is read by the reader 90 and a badge is read by the reader 92.

The sequencer 78 is the main control component for the data entry unit, and it controls in particular the shift register 74, the counter 80 and the switch 84. The sequencer 78 has the following states:

1. In this state, it is reset and causes switch 84 to be in its state making circuit with switch contact 84b.
2. In this state, sequencer 78 does nothing.
3. The sequencer 78 in this state sets the data switch 84 to make circuit with contact 84a; it increments the counter 80 in going from subscan 0 to subscan 1, subscan 1 to subscan 2, etc., or it resets counter 80 in going to the next subscan 0. The sequencer also loads the display 82 with data from the shift register 74 in this state.
4. In this state, sequencer 78 clears shift register 74.
5. Sequencer 78 in this state loads the data shift register 74 with input data from the particular input units 88, 90 or 92 selected by the value in the counter 80.
6. In this state, sequencer 78 ends a read/write operation, and in particular applies a signal by means of lead 120 on the card reader 90 and the badge reader 92 ending any output of data to and from these units.
7. In this state, sequencer 78 simply waits.

The sequencer has the above-mentioned states for every control phase C0, C1, C2, ... C15, and in particular the sequencer 78 is responsive to the first 5 bits of each of the control fields of each subscan. Bit No. 1 of control field C0, for example, puts sequencer 78 in its second above-mentioned state. The subsequent bits 2, 3, 4 and 5 of the control field C0 respectively put sequencer 78 in its states 3, 4, 5 and 6. As will be subsequently described, bits 2, 3, 4 and 5 of the control field, C0 for example, are also transmitted through the transmitter 72 to the following data entry unit on the loop 36, the data entry unit 30 for example. The remaining bits of each control field (bits 6–15) are ignored by the sequencer 78, but these bits also do pass along the loop 36 to the following data entry unit, such as the data entry unit 30 following the first data entry unit 28.

The flow of control bits and data bits passes through the components of the data entry unit 28 as follows: the control bits having excursions from 0 to +1 as shown in FIG. 4 are all recognized and pass through the receiver part 70a. The first control bit $c_1$ passes along lead 94 to the clocking terminal of sequencer 78 and causes the sequencer 78 to change from the above mentioned reset state 1 to its state 2. The second control bit $c_2$ is also applied to the clocking terminal of the sequencer 78 and changes the state of the sequencer 78 to its third state above-mentioned in which switch 84 is put into its condition making contact with switch contact 84a. Therefore, the second control bit $c_2$ (and also the following control bits $c_3$–$c_{15}$) pass to and through the transmitter part 72a to the following data entry unit 30 on the loop 36. The shift register 74 may contain data bits therein from the preceding subscan; and, in this state, sequencer 78 causes the data from the shift register 74 to be transferred in parallel fashion to the display 82 for refreshing one position, such as position 82a of the display. In this state, sequencer 78 also increments or resets the counter 80 so that the counter indicates the current subscan. The following control bits $c_3$, $c_4$ and $c_5$ clear the shift register 74, load the shift register 74 and end the read/write operation all as above described.

The control bits $c_1c_{15}$ maintain the flip latch 76 in set state and thus pass through the line 98 for application to the data terminal of the shift register 74; however, the shift register 74 does not take these bits since no clocking pulses are present on line 96 or are applied onto the clocking terminal of the shift register 74.

Data and tag bits as shown in FIG. 5 pass from the shift register 50 to the receiver 70 of data entry unit 28 following the control bits $c_1$–$c_{15}$. The first of these bits is the tag bit $t_0$ preceding the first data bit $d_1$, and the tag bit $t_0$ passes through the receiver part 70b and onto line 96 resetting flip latch 76 and sequencer 78. This puts sequencer 78 into its state No. 1 as above described. The tag bit $t_0$ also is applied onto the clocking terminal of the shift register 74 so as to start clocking the shift register. The following tag bits $t_1$–$t_{15}$ continue clocking the shift register, and these tag bits repeat for the data fields $D0_4$, $D0_3$, $D0_2$ and $D0_1$. The data bits $d_1$–$d_{15}$ of data field $D0_4$ follow the control bits of control field C0. These data bits pass through the receiver part 70a onto line 94 and are applied onto the flip latch 76. It will be understood that although some of the data bits $d_1$–$d_{15}$ may be missing in order to provide the particular data desired for each of the data entry units 28, 30, 32 and 34, none of the tag bits $t_0$–$t_{15}$ for each of the subscans is missing so that clocking of the shift register continuously takes place during all of the data fields of such subscan. Assuming that the first data bit $d_1$ exists, it is applied by means of lead 94 onto the flip latch 76 which is thus set so that a corresponding signal exists on lead 98 applied to shift register 74. The following tag pulse $t_1$ clocks the shift register 74 and thus in effect shifts the pulse $d_1$ (which may be considered a 1) into the shift register 74 (the tag bit then resets flip latch 76 via line 96). The following data bits $d_2$–$d_{15}$ are shifted into the shift register 74 in the same manner by the tag bits $t_2$–$t_{15}$ so that all of the data bits in effect are shifted into the shift register 74, with each data bit corresponding to a 1 passing through the shift register and with each missing data bit corresponding to a 0 passing through the shift register and spacing the 1's. These 0's and 1's are transmitted through the switch 84 which at this time is in its up position completing a circuit with the switch contact 84b; and the intermixed data bits, or 0's and 1's, are transmitted through the driver part 72a to the next succeeding data entry unit 30. The sequencer 78 remains in its reset condition, (state No. 1 as above listed) since there is a tag pulse $t_1$–$t_{15}$ applied to the reset terminal of the sequencer 78 for each of the data pulses $d_1$–$d_{15}$ applied to the clocking terminal of the sequencer 78.

The 15 bits of the data field $D0_4$ after successively passing through the transmitter 72 as just described pass successively through the shift registers corresponding to the illustrated shift register 74 (FIG. 2) of the DEU's 30, 32 and 34 until finally the fifteen bits of the data field $D0_4$ rest in the shift register of the data entry unit 34. The 15 bits of data field $D0_3$ follow the 15 bits of the data field $D0_4$, and likewise the bits of data field $D0_2$ and $D0_1$ follow the data bits of data fields $D0_3$ and $D0_4$. Therefore, at substantially the same time that the 15 bits of the data field $D0_4$ rest in the shift register of the data entry unit 34; the bits of data field $D0_3$ rest in the shift register of the data entry unit 32; the bits of the data field $D0_2$ rest in the shift register of the data entry unit 30; and the bits of the data field $D0_1$ rest in the shift register 74 of the data entry unit 28. The data bits so resting in the shift registers of the DEU's 34, 32, 30 and 28 may be used for each of the displays of the data entry units or may be used for controlling the card reader 90 or badge reader 92 for each of the data entry units.

The 15 control bits (see FIG. 4) of control field C1 follow the bits of the data fields $D0_4$, $D0_3$, $D0_2$ and $D0_1$, and these control bits function with respect to each of the data entry units 28, 30, 32 and 34 as previously described. Assuming that the data in each of the shift registers 74 is meant for the display 82 in one or more of the data entry units 28, 30, 32 and 34, the second control bit reaching the particular data entry unit will load the display 82 from the shift register 74, shifting the bits out of the shift register 74 in parallel relationship to the display. If, on the other hand, the data bits in the shift register are also intended for controlling the card reader 90 or badge reader 92, these data bits pass from the shift register 74 through the display 82 and line 120 to the units 90 and 92.

The third and fourth control bits change the state of the sequencer 78 in each of the data entry units 28, 30, 32 and 34 to its fourth and fifth states respectively. In the fifth state of the sequencer 78, the data shift register 74 of the data entry unit will be loaded with fifteen bits of new data, either from the keyboard 88, the card reader 90 or the badge reader 92 connected to the particular data entry unit being considered. In the event that the units 88, 90 and 92 are not operating at the time, 15 0's will be loaded in the shift register 74 of the particular data unit.

It should be noted that the first control bit arriving at a particular data entry unit, such as the control bit $c_1$ of the control field C0 for the first data entry unit 28 is used up by the sequencer 78 and is not transmitted farther on the loop 36. Therefore, the first control bit for the second data entry unit 30 on the loop 36 is the control bit $c_2$, and this bit is used up by the sequencer 78 of the data entry unit 30. Likewise the data entry units 32 and 34 utilize and absorb the control bits $c_3$ and $c_4$. The remaining control bits $c_5$–$c_{15}$ pass out of the data entry unit 34 back to the microcontroller 38 through the shift register 52 and are not used for any particular purpose.

One of the functions of the counter 80 for each of the data entry units 28, 30, 32 and 34 is to determine what new data will supplant the data which has been shifted out of the shift register 74 for each of the data entry units. The counter 80 does this by controlling funnel 86. As previously mentioned, the counter 80 is updated by the sequencer 78 so that the counter 80 upcounts for each of the subscans. For an initial count of the counter 80, the counter 80 may determine that the output of the keyboard 88 for the particular data entry unit shall be the supplanting data for the shift register 74 of that data entry unit. The next count of the counter 80 may indicate that the card reader 90 may provide the supplanting data, and the next count of the counter 80 may indicate that the badge reader 92 provides the supplanting data.

As has been previously mentioned, the bits of data fields $D0_4$, $D0_3$, $D0_2$ and $D0_1$ are present in the shift registers 74 of the data entry units 34, 32, 30 and 28 substantially at the same time, and these data bits stop and remain in these shift registers for a certain small period of time, for example, 30 microseconds. It is during this time that these 15 data bits are transferred out of the respective shift registers 74 to the respective displays 82, for example, before these bits are supplanted either with 1's or 0's of new data. All of the data bits thus supplied to the shift registers 74 of the four data entry units 28, 30, 32 and 34 have thus been supplanted, and subsequent shifting actions of the shift registers 74 thus provide completely new data (all 0's or data from the units 88, 90 and 92 of the respective data entry units) to the microcontroller 38 through the shift register 52. As this new data is transferred to the microcontroller 38, new data such as for display, in the form of subscan 1 following subscan 0, is moving from the shift register 50 through the loop 36 to the data entry units 28, 30, 32 and 34 in the same manner as has just been described in connection with the data bits in subscan 0.

The time length of each of the five fields in subscan 0 (and in the succeeding subscans 1–15) is determined by the master oscillator 39 which controls the microcontroller 38 and may be for example 100 microseconds for each field. As is shown in FIG. 3, control field C1 follows data field $D0_1$, (and it is during the time of control field C1 in which the data supplied during subscan 0 to each shift register 74 is shifted from the shift register 74 to the display 82 in each of the data entry units as just described), and there is actually preferably a dead time between the end of the data field $D0_1$ and the beginning of the control field C1 which may be for example 40 microseconds. The start of each of the subscans 0–15 is synchronized with the 60 cycle power line 54 of the system effective on the microcontroller 38, but the time length of each of the fields in each of the subscans is determined asynchronously by the master oscillator 39 of the microcontroller 38 of each of the data entry units. Thus, it is apparent that the 40 microseconds just above mentioned can vary slightly.

One of the data bits ($d_{15}$) in each of the data fields, the data fields $D0_4$, $D0_3$, $D0_2$ and $D0_1$, in subscan 0 is allocated to reset the counter 80 for synchronizing the counter 80 with a counter (not shown) maintained by the microcontroller 38 so that the operation of a microcontroller 38 is synchronous with respect to the operation of all of the elements of the data entry units. This may be contrasted with the asynchronous relationship between the operation of the microcontroller 18 and the microcontroller 38.

Subscan 1 follows subscan 0, and the control bits $c_1$–$c_{15}$ of control field C1 perform the same functions of the control bits with respect to the data bits in data fields $D0_4$, $D0_3$, $D0_2$ and $D0_1$ as above mentioned. The data fields $D1_4$, $D1_3$, $D1_2$ and $D1_1$ follow, and these data bits are held in the shift register 74 of each of the data entry units in the same manner as the data bits were held in subscan 0. If the data bits in subscan 1 are used for the display 82 in any of the data entry units, the data bits in subscan 1 will operate on different display elements. The data bits in subscan 0 may, for example, be used for the display part 82a while the data bits of subscan 1 may for example be used for the display part 82b.

The control bits and data bits for each of the following subscans 2–15 perform the same functions and flow through the circuitry in the same manner as has just been described in connection with the control and data bits of subscans 0 and 1. If the data bits are used for the displays 82, the bits of subscans 0–7 take care of all of the eight display parts 82a–82h, and the following subscans 8–15 simply repeat the functions. If the data bits are used for other than the displays 82, the bits in subscans 8–15 may perform other functions with respect to the badge reader 92 and card reader 90 in each of the data entry units.

Figure 6:
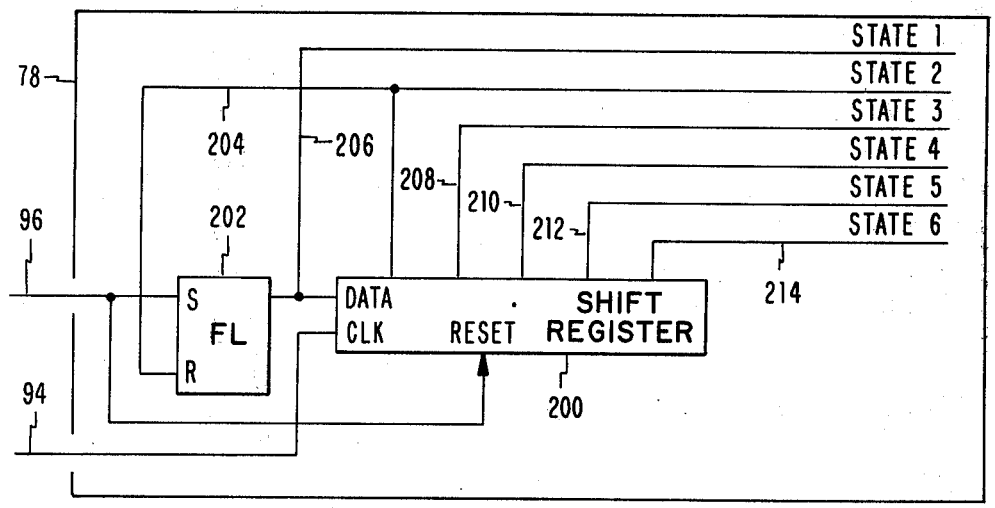
FIG. 6 is a diagrammatic illustration of the components of a sequencer which is a part of each of the data entry units and which is shown in block form in FIG. 2.

The sequencer 78 is shown schematically in FIG. 6 and may be seen to comprise a shift register 200 and a flip latch 202. The flip latch 202 has set and reset terminals to which the lead 96 and a lead 204 are respectively connected and has an output to which a lead 206 is connected. The shift register 200 has data, clock and reset terminals to which the leads 206, 94 and 96 are respectively connected. The leads 206, 204, 208, 210, 212 and 214 constitute the outputs of the sequencer 78 corresponding to states 1, 2, 3, 4, 5 and 6 of the sequencer which have been previously mentioned; and the leads 204, 208, 210, 212 and 214 constitute outputs of the shift register 200. In operation, a signal on line 96 functions to put the sequencer 78 in its state No. 1 previously referred to. In this state, a signal on line 96 has set the flip latch 202 and has reset the shift register 200 so that the shift register 200 contains all zeros. In this condition, latch 202 provides a "state 1" signal on line 206. For each pulse occurring on line 94, the shift register 200 clocks one position. On the first pulse on line 94, a "1" is clocked into the data terminal of the shift register 200; and this forces a 1 to appear on the "state 2" line 204. Line 204 is connected with the reset terminal of the latch 202, and this forces the latch 202 to reset. A second pulse on line 94 clocks the 1 one position farther in the shift register 200 so that the "state 3" line has a signal on it, and the signal on the state 2 line 204 disappears. This process continues to cause signals to successively appear on the lines 208, 210, 212 and 214 corresponding to the above mentioned states 3, 4, 5 and 6 respectively. Any further pulses on clock line 94 will result in none of the state lines 206, 204, 208, 210, 212 and 214 having a signal on it as the 1 initially put into the shift register 200 in the transition from state 1 to state 2 has been shifted out of the shift register 200.

It will be apparent that the data entry unit system above described is self-clocking, and no clocking lines in addition to the data loop line 36 need be used connecting the microcontroller 38 with the data entry units 28, 30, 32 and 34. The line 36 is actually a wire pair, one of the pair being a ground wire and the other of the pair being a wire carrying differences in potential with respect to ground, assuming that logic is used that is driven by differences in electric potential.

It will be apparent that self-clocking is obtained by sending the control bits $c_1$–$c_{15}$ and then in effect sending additional controlling bits (the tag bits $t_0$–$t_{15}$ for the remaining data bits of each of the subscans) with circuitry including the two part receiver 70 being provided for each of the data entry units for distinguishing between the two types of controlling bits, the control bits $c_1$–$c_{15}$ and the tag bits $t_0$–$t_{15}$. Thus, the control bits may control the data entry unit to cause transfer of data, etc., and the tag bits may maintain the data entry units each in phase with the microcontroller 38, particularly by clocking data through the shift registers 74 of each of the data entry units.

Since the data entry unit system is self-clocking, no local oscillators are needed in the data entry units, and no logic in each of the data entry units need be provided for determining if valid and complete data has been received by each of the data entry units.

What is claimed:

1. A data entry unit system comprising:

a central controller, a series of remote stations, a transmission line connected with said controller and connecting said remote stations together in a series, said controller being constructed to provide to said line a series of data bits in spaced time positions which are indicative of data depending on which of the data bits exist or are missing in said positions and a preceding series of control bits and a series of tag bits in time positions following each of the time positions designated for said data bits, said data bits and control bits constituting electrical excursions in one direction from a median electrical value and said tag bits constituting electrical excursions in the other direction from said median electrical value, said remote stations including:

a receiver in each of said stations receiving bits from said controller constructed to distinguish between said bits having excursions in one direction as distinguished from said bits having excursions in the other direction, means in each of said stations in said series prior to the ultimate one of said stations for transmitting at least some of said data and control and tag bits from said receiver through the station and to said transmission line, means in each of said stations for accumulating a field of consecutive data bits received by its said receiver from said line, a data bit utilization means in each of said stations, and means in each of said stations under the control of one of said control bits for shifting the data bits accumulated in the station to said data bit utilization means in the station.

2. A data entry unit system as set forth in claim 1, said transmission line being in the form of a loop which has a bit receiving end and a bit supplying end connected with said controller, each of said stations including means for originating new data bits and said transmitting means in each of said stations being arranged to transmit said new data bits through the loop and to its bit supplying end and thereby to said controller.

3. A data entry unit system as set forth in claim 2, said means for accumulating said data bits in each of said stations including a shift register which accumulates the data bits in each of said stations.

4. A data entry unit system as set forth in claim 2, said receiver having a first part providing output signals for said data and control bits and having a second part providing output signals for said tag bits, said means for accumulating a field of data bits including a shift register and means for connecting the shift register with said first receiver part so that data bits therefrom are moved serially into said shift register.

5. A data entry unit system as set forth in claim 2, said means for accumulating a field of data bits in each of said stations including a shift register and a means for connecting said shift register with said receiver so that data bits are fed therefrom into the shift register for shifting therethrough, said means for transmitting bits including a transmitter connected to said loop and switch means for connecting the ultimate end of said shift register with said transmitter so that data bits within the shift register are transmitted farther in said serial loop.

6. A data entry unit system as set forth in claim 2, said means for accumulating a field of data bits in each of said stations including a shift register connected to receive data bits from said receiver in the station, said means under the control of one of said control bits for shifting the data bits accumulated in each of said stations to the data bit utilization means in the station including a sequencer connected with said receiver to receive control bits therefrom, said sequencer in response to a control bit subsequent to said one control bit for shifting accumulated data bits moving the said new data bits into said shift register.

7. A data entry unit system as set forth in claim 6 and including a second means for originating new data bits and means under the control of said sequencer and including a counter for determining which of said two means for orginating new data bits is functional to provide data bits to said shift register at a particular time.

8. A data entry unit system as set forth in claim 2, said receiver having a first part providing outputs for said data and control bits and having a second receiver part providing outputs for said tag bits, said means for accumulating a field of data bits in each of said stations including a shift register having a data terminal connected with said first receiver part and a clocking terminal connected with said second receiver part, said means for transmitting said data bits including a transmitter having a first part for outputting data and control bits from the respective station and a second transmitter part for outputting tag bits from said station and switch means for connecting either the output of said shift register of said first receiver part with said first transmitter part, said means under the control of one of said control bits including a sequencer which is connected to said first receiver part so as to be changed in state by said control bits and being responsive to another control bit in addition to said one control bit so as to disconnect said first transmitter part with the output of said shift register and connect said first transmitter part with said first receiver part.

9. A data entry unit station comprising:

a receiver for bits applied thereto having a first receiver part providing output signals for bit excursions in a first direction and a second receiver part providing output signals for bits applied thereto having excursions in the other direction, a shift register having a data entry terminal connected to the output of said first receiver part, a transmitter having a first transmitter part for providing output signals for excursions of bits applied thereto in said first direction and having a second transmitter part providing output signals for bits having excursions in said other direction, means connecting the output of said second receiver part with the input of said second transmitter part and switch means alternately connecting the input of said first transmitter part with the output of said shift register or with the output of said first receiver part.

10. A data entry unit station as set forth in claim 9 and including a sequencer having its input connected with the output of said first receiver part in order to change the state of the sequencer with an output of said first receiver part, said sequencer being connected with said switch means so as to change the condition of the switch means as said sequencer changes state.

11. A data entry unit station as set forth in claim 10 and including a bit utilization means and a source of new bits, said sequencer controlling said shift register so as to shift the bits in parallel out of the shift register into said data bit utilization means on the reception of a control bit from said first receiver part and to shift the new data bits into said shift register in place of the bits shifted thereout on the reception of another control bit applied to the sequencer from said first receiver part.

* * * * *